(12) United States Patent
Hafellner et al.

(10) Patent No.: US 11,092,515 B2
(45) Date of Patent: Aug. 17, 2021

(54) HIGH-POWER, WEATHER RESISTANT PLATFORM FOR A TEST SYSTEM FOR TESTING COLLISION OR NEAR-COLLISION SITUATIONS

(71) Applicant: 4ACTIVESYSTEMS GMBH, Traboch (AT)

(72) Inventors: Reinhard Hafellner, Spielberg (AT); Martin Fritz, Kobenz (AT)

(73) Assignee: 4ACTIVESYSTEMS GMBH, Traboch (AT)

( * ) Notice: Subject to any disclaimer, the term of this patent is extended or adjusted under 35 U.S.C. 154(b) by 229 days.

(21) Appl. No.: 16/315,629

(22) PCT Filed: Jul. 5, 2017

(86) PCT No.: PCT/EP2017/066808
§ 371 (c)(1),
(2) Date: Jan. 5, 2019

(87) PCT Pub. No.: WO2018/007458
PCT Pub. Date: Jan. 11, 2018

(65) Prior Publication Data
US 2020/0003658 A1    Jan. 2, 2020

(30) Foreign Application Priority Data
Jul. 6, 2016 (DE) .................. 10 2016 112 427.3

(51) Int. Cl.
*G01M 17/007* (2006.01)
(52) U.S. Cl.
CPC .................. *G01M 17/0078* (2013.01)
(58) Field of Classification Search
CPC .................................................. G01M 17/0078
See application file for complete search history.

(56) References Cited

U.S. PATENT DOCUMENTS

| 3,098,319 A | 7/1963 | Ellis |
| 3,425,154 A | 2/1969 | Lindsey et al. |

(Continued)

FOREIGN PATENT DOCUMENTS

| AT | 11171 U2 | 5/2010 |
| AT | WO2012156484 | 11/2012 |

(Continued)

OTHER PUBLICATIONS

International Search Report for PCT/EP2017/066808.

(Continued)

*Primary Examiner* — David Z Huang
(74) *Attorney, Agent, or Firm* — Indiano Law Group, LLC; E. Victor Indiano; John T. Woods

(57) ABSTRACT

The present invention relates to a platform for testing collisions or near-collision situations between a collision body, in particular a vehicle, and a test object. The platform has a base body, which has a bottom surface and an attachment surface formed opposite to the bottom surface, wherein an attachment device is formed on the attachment surface for attaching the test object. Furthermore, the platform has at least one roller element, which is arranged at the bottom surface, wherein the roller element configured such that the base body is displaceable along a ground by the roller element. An installation box having an installation volume is arranged in a receiving opening of the base body, wherein the installation box is conceived in the receiving opening of the base body such that a temperature control region of the installation box is in contact with a surroundings of the base body. The temperature control region is formed of a material, which has a greater heat conductivity coefficient than a material of the base body.

20 Claims, 3 Drawing Sheets

(56) References Cited

U.S. PATENT DOCUMENTS

Figure 1:
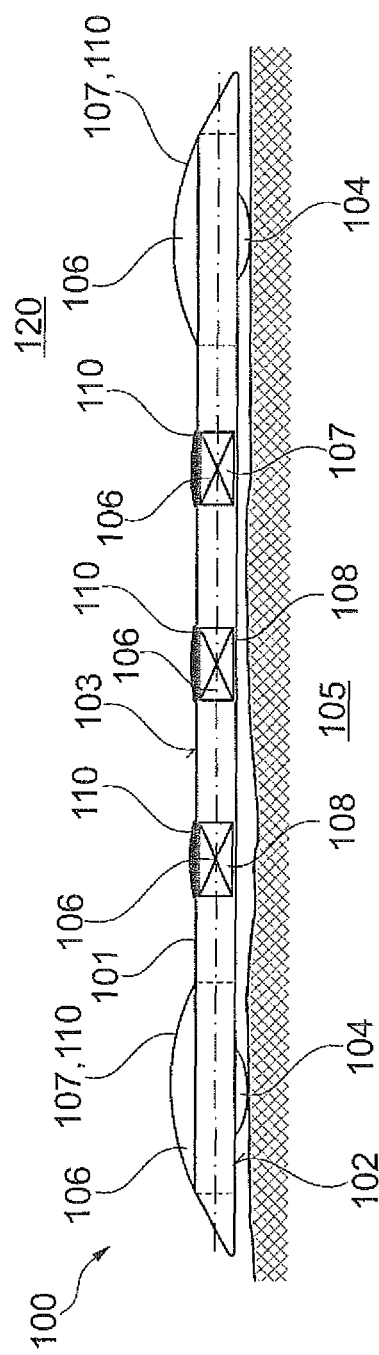

| | | |
|---|---|---|
| 3,557,471 A | 1/1971 | Payne et al. |
| 3,583,098 A | 6/1971 | Bear |
| 5,075,822 A | 12/1991 | Baumler et al. |
| 5,208,728 A | 5/1993 | Schirmer |
| 5,224,896 A | 7/1993 | Terzian |
| 6,120,343 A | 9/2000 | Migliorati et al. |
| 9,355,576 B2 | 5/2016 | Fritz |
| 9,870,722 B2 | 1/2018 | Fritz et al. |
| 2005/0021180 A1 | 1/2005 | Kwon et al. |
| 2005/0066705 A1 | 3/2005 | Choi |
| 2005/0155441 A1 | 7/2005 | Nagata |
| 2006/0075826 A1 | 4/2006 | Roberts et al. |
| 2007/0297145 A1* | 12/2007 | Karrer ............... H05K 7/20254 361/720 |
| 2008/0036075 A1* | 2/2008 | Taylor ............... H01L 23/3677 257/713 |
| 2010/0078987 A1 | 4/2010 | Lubecki |
| 2013/0162479 A1* | 6/2013 | Kelly ............... G01M 17/0078 342/385 |
| 2014/0102224 A1 | 4/2014 | Fritz |
| 2014/0144207 A1 | 5/2014 | Weber |
| 2015/0317917 A1 | 11/2015 | Fritz et al. |
| 2016/0054199 A1 | 2/2016 | Fritz et al. |

FOREIGN PATENT DOCUMENTS

| | | | |
|---|---|---|---|
| CN | 101978250 | 2/2011 | |
| DE | 3906973 A1 | 3/1989 | |
| DE | 9103575 U1 | 3/1991 | |
| DE | 3901079 | 3/1993 | |
| DE | 4307902 C1 | 3/1993 | |
| DE | 19802590 | 8/1999 | |
| DE | 10 2007 024565 | 2/2008 | |
| DE | 102008051233 | 5/2009 | |
| DE | 102007035474 | 6/2009 | |
| DE | 102008022546 | 11/2009 | |
| DE | 102008025539 | 12/2009 | |
| DE | 102008030208 | 12/2009 | |
| DE | 102011012542 | 2/2011 | |
| DE | 102011017146 | 10/2012 | |
| EP | 0034862 | 9/1981 | |
| EP | 0508286 B1 | 9/1995 | |
| EP | 1010919 | 12/1999 | |
| EP | 1734352 | 12/2006 | |
| EP | 2192567 | 11/2008 | |
| EP | 2 845 777 A1 | 3/2015 | |
| FR | 2680902 | 5/1993 | |
| GB | 2469932 | 11/2010 | |
| JP | 2000-167259 | 5/1999 | |
| JP | 2001183042 | 7/2001 | |
| JP | 2004122916 | 4/2004 | |
| JP | 2000-167259 | 6/2006 | |
| JP | 2000-039686 | 2/2008 | |
| JP | 2014043151 | 3/2014 | |
| WO | WO 01/60474 | 8/2001 | |
| WO | WO160474 | 8/2001 | |
| WO | WO 2009144199 | 5/2009 | |
| WO | WO2009103518 | 8/2009 | |
| WO | WO 2012/156484 | 11/2012 | |
| WO | WO-2013070155 A1 * | 5/2013 | ............ B61B 13/00 |

OTHER PUBLICATIONS

English language translation of Abstracts of foreign language references from International Search Report.
International Search Report for PCT/EP2012/059203.
English Translation of Office Action of Japan Patent Office; dated Nov. 1, 2016.
Advanced crash avoidance Tachnologies Program—Final report of the Honda—DRI Team (Dot HS 811 454 A) Jun. 2011.
International Search Report for PCT/EP2013/058,994 (12 pages).
Cited References WO 2012/156484—Translation of DE 102008025539; DE 102007035474.
Translations of Abstracts of JP 2000-167259 and JP 2008-039686.
References cited in the ISR (2 pages).
U.S. Department of Transportation; Advanced Crash Avoidance Technologies Program—Final Report of the Honda—SRI Team.
English translation abstract of FR 2580902.
English Translation for DE102008025539.
Hafellner, Reinhard; High-Power weather resistant platform for a test system for testing collisions or near-collision situations; Published Chinese Patent Application 109716094; May 3, 2019; WIPO Machine translation; https://patentscope.wipo.int/search/en/detail.jsf?docId=CN242179311&tab=NATIONALBIBLIO&_cid=P11-KM0Y9D-60561-1.
CNIPA; Office Action dated Feb. 1, 2021; High-Power weather resistant platform for a test system for testing collisions or near-collision situations; Published Chinese Patent Application 109716094.
European Patent Office; Device for cooling electric parts by circulating coolant; Japanese patent application 2001-183042A; English language translation; Apr. 27, 2021.
Japan Platform for Patent Information; Cooling device for electric working vehicle; Japanese patent application 2004-122916; English language translation.
Japan Platform for Patent Information; Caster; Japanese patent application 2014-043151; English language translation.
Japan Patent Office; Notice of Reasons for Refusal; Japanese patent application 2019-500477; Mar. 20, 2021. English language translation.

* cited by examiner

HIGH-POWER, WEATHER RESISTANT PLATFORM FOR A TEST SYSTEM FOR TESTING COLLISION OR NEAR-COLLISION SITUATIONS

CROSS-REFERENCE TO RELATED APPLICATION

The present application is a national phase application derived from the international patent application no. PCT/EP2017/066808 filed Jul. 5, 2017, which in turn benefits from the filing date of the German patent application no. DE 10 2016 112 4273, filed Jul. 6, 2016, both of which are incorporated herein by reference in their entirety.

TECHNICAL AREA

The present invention relates to platforms for testing collisions or near-collision situations between a collision body, in particular a vehicle, and a test object, as well as a method for manufacturing platforms.

BACKGROUND OF THE INVENTION

In modern automotive technology, more and more assistance systems come into operation, which systems actively monitor the surroundings of the vehicle and passively or actively intervene in the steerage of the vehicle. Assistance systems therefore have to be subjected to tests to the full extent in order to prevent misjudgements of the assistance systems.

For testing modern assistance systems, collisions or near-collision situations between the vehicle to be tested and a test object are effectuated. For a collision between a vehicle and a test object, for example, the vehicle or the test object is arranged stationary at a defined position, and the collision partner is accelerated to a defined velocity. In order to effectuate a collision situation close to reality, such as for example a collision of two vehicles or of a vehicle with a person in road traffic, both the vehicle and the test object are set in motion in order to generate a collision or a near-collection situation. At this time, in particular driver assistance systems can be tested close to reality.

In order to test an assistance system for all imaginable situations, is necessary that both the vehicle and the test object move towards each other from test to test, from the most different directions. In order to effectively test situations, it is necessary that a test system can be adapted quickly and without complex reconstructions to different test situations. For this purpose, it is known, for example, to place test objects, such as for example a dummy, on a displaceable support, and to pull the support, for example using cable control systems, in one direction, which crosses a driving path of a test vehicle.

In doing so, it is necessary that the components and devices of the test system are formed inconspicuously such that the test system does not influence the assistance system during the test, because otherwise no realistic experiments can be carried out.

SUMMARY OF THE INVENTION

There may be a need to establish a temperature-resistant, high-performance and weather-proof displaceable platform for a test system.

This object is solved by a platform for testing collisions or near-collision situations between a collision body and a test object as well as by a method for manufacturing a platform for testing collisions or near-collision situations between a collision body and a object, according to the independent patent claims.

According to an exemplary embodiment of the present invention and a first aspect of the invention, there is described a platform for testing collisions or near-collision situations between a collision body, in particular a vehicle, and a test object. The platform has a base body, which has a bottom surface and an attachment surface formed opposite to the bottom surface, wherein an attachment device is formed on the attachment surface for attaching the test object. Furthermore, the platform has at least one roller element, which is arranged at the bottom surface, wherein the roller element is formed such that the base body is displaceable along a ground by the roller element. The platform further has an installation box having an installation volume, which box is arranged in a receiving opening of the base body, wherein the installation box is provided in the receiving opening of the base body such that a temperature control region of the installation box is in contact with surroundings of the base body. The temperature control region is formed of a material, which has a greater heat conductivity coefficient than a material of the base body.

According to an exemplary embodiment of the present invention and a further second aspect of the invention, there is described a test system for testing collisions or near-collision situations between a collision body, in particular a vehicle, and a test object. The test system has a platform of the type described above and a test object, wherein the test object is attached on the attachment surface by the attachment device.

According to an exemplary embodiment of the present invention and a third aspect of the invention, there is described a method for manufacturing a platform for testing collisions or near-collision situations between a collision body, in particular a vehicle, and a test object. According to the method, a base body is provided, which has a bottom surface and an attachment surface formed opposite to the bottom surface, wherein an attachment device is formed on the attachment surface for attaching the test object. Furthermore, according to the method, at least one roller element is arranged at the bottom surface of the base body, wherein the roller element is formed such that the base body is displaceable along a ground by the roller element. The platform further has an installation box having an installation volume, which box is arranged in a receiving opening of the base body, wherein the installation box is provided in the receiving opening of the base body such that a temperature control region of the installation box is in contact with a surroundings of the base body. The temperature control region is formed of a material, which has a greater heat conductivity coefficient than a material of the base body.

The collision body may, for example, represent a passive and statically present element, such as for example an impact wall or a standing object, such as for example a vehicle. Alternatively, the collision body may represent a self-moving object, such as for example a vehicle, such as for example a passenger car, a heavy goods vehicle, a bus or a bicycle.

The test object, which may be attached on the platform, may be, for example, a dummy similar to a human, which dummy may be attached to the platform standingly, lyingly or sittingly. Furthermore, the object may represent a vehicle mock or a bicycle mock.

The test system may have the platform described above and the test object. The platform may be displaceable along a ground by the roller element described in more detail further below. The platform on which the test object may be arranged, may cross the driving path of the collision body, such that the approach of the test object to the collision body may be measured by driver assistance systems, and these may thereby be tested.

The platform may have the base body, which may form a sheet-shape. This means that its extension within a ground plane may be greater than its thickness in, for example, vertical direction. The base body may have a bottom surface and an opposing attachment surface. The base body may be beared on a ground with its bottom surface. The at least one roller element may be rotatably arranged in the bottom surface, which roller element may at least partially protrude out of the base body and thus provides a space (or distance) between the base body and the ground. An attachment device may be formed on the attachment surface. The attachment device may be configured to fix the test object. Furthermore, the attachment device may be formed controllable, in order to release the test object selectively, for example shortly prior to an impact situation, such that the attachment between the base body and the test object may be detached.

The attachment device may consist for example of a hook system, into which the test object can be hooked in. Furthermore, the attachment device may have a magnet, in particular a controllable electromagnet, in order to fix the test object to the attachment surface by a magnetic holding force.

The at least one roller element may be arranged at the bottom surface. In a preferred embodiment, three or four roller elements may be arranged at the base body, namely spaced at a distance at the bottom surface. Thus, a high rolling stability and a good controllability (or steerability) of the platform may be given. The roller element may consist, for example, of rubber rollers, duroplastic plastics rollers or plastic material rollers.

The platform may be displaceable along the ground by the at least one roller element. Herein, a pulling mechanism, such as for example a tow cable or a tow bar, may be fixed to the base body, in order to pull the platform over the ground. Furthermore, the base body may be fixed on a guiding rail, wherein the base body may be displaceable along the guiding rail by the roller element. Furthermore, the platform may be configured freely displaceable in that the roller element may be self-propelled as is described in more detail further below, and may be configured steerable, according to an exemplary embodiment.

The installation box may have an installation opening, through which the installation volume may be accessible from the outside. The installation box may be formed integrally, for example, as a recess in the base body. Furthermore, the installation box may form a self-supporting unit, and may be arranged in the base body and/or in a receiving opening that may accordingly be provided for this purpose. In the installation volume of the installation box, one or more functional elements of the platform may be incorporated. Thus, for example, the roller elements, sensors, in particular optical sensors and acceleration sensors, drive units, position measurement systems (e.g. GPS-based systems), or control units (CPU units) may be installed as functional units in the installation box.

Furthermore, plural installation boxes may be arranged and formed in the base body in order to install functional elements there. The installation boxes, which may be spaced at a distance, may be functionally coupled to each other, for example for data exchange (for example through conducting wires or light wave guides).

The temperature control region of the installation box may be a region of the latter, which region may be in contact the surroundings of the base body, i.e. for example with the ambient air of the base body. Thus, the ambient air of the base body may be utilized as a coolant and the temperature control unit may emit heat from the interior of the installation box to the surroundings. Thus, in particular the temperature from functional units in the installation volume may be emitted outwardly to the surroundings via the temperature control region.

In particular, the temperature control region may be formed of a material, which may have a greater heat conductivity coefficient than a material of the base body. The heat conductivity coefficient may describe the heat conductivity of a material. The heat conductivity $\lambda$ [W/(m*K)] (Watts per meter and Kelvin) of a material may define the heat flow through a material due to its heat conductivity. For example, the heat conductivity $\lambda$ of the material of the temperature control region may be greater than about 20 W/(m*K), in particular greater than 100 W/(m*K), greater than 200 W/(m*K), greater than 250 W/(m*K), or greater than 300 W/(m*K). The material of the temperature control region may be, for example, a metallic material. For example, in this respect, the material of the temperature control region may represent titanium, aluminium, gold steel, or copper.

Herein, the installation box may be formed completely of the same material as that of the temperature control region. Alternatively, in a exemplary embodiment, the installation box may consist of a further base body, which may have a first material, and the temperature control region may have a material which may have a second material, wherein the first material and the second material may differ. Furthermore, in particular the second material may have a greater heat conductivity coefficient than the material of the base body of the platform. In this respect, the second material of the temperature control region may have a greater heat conductivity coefficient than the first material of the further base body of the installation box. Thus, for example, the further base body of the installation box may consist of a plastic material, while the temperature control region of the installation box may be formed of a metallic compound.

The material of the base body of the platform may have, for example, a heat conductivity coefficient, which may be smaller than about 250 W/(m*K), in particular smaller than 50 W/(m*K), smaller than 1 W/(m*K), or smaller than 0.1 W/(m*K).

According to a further exemplary embodiment, the material of the base body of the platform may be an organic material, i.e. a material, which may consist of carbon, oxygen, hydrogen or nitrogen bonds. The organic material may be plastic material, in particular a fiber reinforced material. Herein, the fiber reinforced material may, for example, have carbon fibers or glass fibers, which may be formed in an artificial resin or another matrix material having elastic properties. For example, the plastic material and/or fiber material may consist of an elastomer, e.g. a thermoplastic material. Furthermore, the material of the base body may be a rubber and/or a hard rubber material. Furthermore, the organic material may be a wood material.

With the platform according to the invention, the base body of the platform between the installation boxes may be formed very flatly. The base body may have a broadening (or bulging out) in a region of the installation box, in the installation box, all functional units may be installed, which may be necessary operating the platform and for carrying out the tests. Due to the material selection according to the invention of the temperature control region of the installation box, the generated heat of the functional units in the installation volume may be dissipated targetedly and effectively. Herein, it may not be necessary to select the material of the base body as a function of its heat conductivity properties, because the function of the heat dissipation may be fulfilled exclusively by the temperature control region of the installation box. Thus, an advantageous material combination between the installation box and the base body of the platform may be selected, without risking an overheating of the functional elements. Thus, by the platform according to the invention, a high-performance and weather-proof displaceable platform may be provided, in which high-performance functional elements may be used, and which may be formed at the same time robustly and efficiently.

According to a further exemplary embodiment, the installation box may have an installation opening, through which the installation volume may be accessible from the surroundings, wherein the lid may be formed in particular at least partially in the temperature control region, wherein the lid may be detachable such that an access to the installation volume may be providable. The lid may be detachably fixed to a base body of the installation box or to the base body of the platform, for example, by a screwed connection or by additional attachment elements, such as for example screws. The lid may close the installation opening of the installation box and thus may protect the functional equipments within the installation box. The lid may consist of the same material as the base body of the installation box. Alternatively, the lid may form temperature control region and may have a different material in comparison to the base body of the installation box. For example, the base body of the installation box may consist of a material, which has a lower heat conductivity coefficient than a material of the lid. Thus, for example, the base body of the installation box may consist of an organic material, such as for example a plastic material or wood, and the lid may consist of a metallic material, such as for example aluminium or, copper.

According to a further exemplary embodiment, the installation box may have a sealing element, in particular a sealing ring, wherein the sealing element may be arranged in the lid such that the installation volume may be sealed from the surroundings. Thus, the installation volume may be protected also from outer influences, such as, for example, rain or dirt particles.

According to a further exemplary embodiment, the installation box, in particular with the temperature control region, may protrude from the attachment surface in a region of the attachment surface and/or the bottom surface, wherein the region may form in particular a dome shape.

The dome shape may thus form a curved cap, which may protrude from a plane, in which the attachment surface and/or the bottom surface extends. Thus, a sufficient installation space may be established also in the case, of a thin implementation of the base body. Due to the dome shape, sensor radiations, such as for example radar radiation, which may be generated by the assistance systems to be tested, may be reflected back such that the reflected radiation may not be measurable and/or only very negligibly measurable by the assistance system. Thus, it may be prevented, that the assistance systems measure interferences, which may result from the thickening of the installation volume.

The dome shape may be formed, for example, by the lid described above. In other words, the lid has a ball shape, wherein the lid can be fixed detachably to the base body and/or to the installation box.

The temperature control region, and in particular the dome shape, may have, for example, an edge length or a diameter ranging from 10 cm to 40 cm, in particular 30 (centimeter). The area of the temperature control region may accordingly be between about 100 $cm^2$ and 1600 $cm^2$ (square centimeter), particular 900 $cm^2$.

According to a further exemplary embodiment, the installation box may be formed of a material, which is stiffer than the material of the base body. The material of the installation box may have in particular a density of more than 2500 $kg/m^3$. Thus, for example, the functional units in the installation box may be installed protectedly (or in a protected manner), while the base body may elastically deform around the installation box. In this way, it may be ensured in the case of a load of the platform, that the base body may deform elastically, without however impairing the sensible functional elements, because these may be present in the stiffer and harder installation box.

According to a further exemplary embodiment, the installation opening of the installation box may be formed in a bottom surface of the base body. Thus, a simple access to the installation box may be provided via the bottom surface.

According to a further exemplary embodiment, the platform may have a functional element, which may generate heat during operation. The functional element may be installed in the installation volume of the installation box, wherein the functional element may not thermally coupled to the temperature control area, such that a heat transfer may be providable from the functional element to the temperature control area. Thus, for example, the roller elements, sensors, drive units or control units as functional units may be installed in the installation box.

The term "thermally coupled" may define a connection between the temperature control area and the functional element, along which a heat transfer from the functional element to the temperature control region may take place. Thus, no insulating air gap may be conceived between the functional element and the temperature control area.

According to a further exemplary embodiment, the functional element may have a contact surface, which may be configured to contact the temperature control area in order to provide the thermal coupling.

According to a further exemplary embodiment, an adapter means, in particular a heat, conducting paste, may be provided between the functional element and the temperature control area, such that a heat transfer from the functional element to the temperature control region may be providable. A heat conducting paste may be a paste, which may improve the heat transfer between two objects. The composition of the respective heat conducting pastes may be dependent from the required heat conductivity. For example, heat conducting pastes may include primarily silicon oil and zinc oxide, and may be manufacturable with aluminium copper, graphite and/or silver components. Furthermore, the heat conducting paste may have a thermoplastic plastic material.

According to a further exemplary embodiment, the functional unit may be a drive unit, which may be configured to rise the at least one roller element. The drive unit may represent an electric motor. For example, one drive unit may be assigned to each roller element. This may, for example, directly drive an axle of the roller element. Furthermore, a central drive unit may be installed in the base body, wherein the central drive unit may drive, for example, plural roller elements simultaneously.

According to a further exemplary embodiment, the drive unit may be arranged spaced at a distance to the at least one roller element, wherein the drive unit may be coupled to the roller element for transferring a drive force, in particular by a drive belt, by a gear transmission, in particular a spur-gear system, and/or as a direct drive. The coupling may also be provided by a drive chain or by a gear train.

According to a further exemplary embodiment, the functional unit may be a sensor element, in particular an acceleration sensor, an optical sensor, a position measurement sensor (e.g., GPS sensor) temperature sensor, which sensor element may be arranged in the installation box.

According to a further exemplary embodiment, the functional unit may be a control unit for controlling the roller elements. The control unit may be configured for wireless data exchange with a further external operation unit for generating control data. The control unit may have, for example, a transmission and receiving unit, by which measurement data, control data or other information may be transmitted to an external and spaced apart unit. Furthermore, the control unit may be, for example, coupled to the roller elements and the drive units in order to thus control the roller elements and the steering control of the roller elements. The operation unit may, for example, represent a remote control, which is operated by a user. Furthermore, the operation unit may be a part of a control computer, which may control the movement, i.e. the direction and the velocity, of the collision body and/or the direction and velocity of the platform in order to thus simulate desired test situations.

According, to an exemplary embodiment of the invention, the base body may be formed of an elastically deformable material having a density of less than 2500 kg/m$^3$.

According to a further embodiment, the installation box may have cooling fins, which may extend along a surface of the temperature control region. The cooling fins may extend from the surface in particular in the direction of the surroundings. The cooling floe may serve to increase the surface of the temperature control body, in order to improve the heat transfer to the surroundings and thus the cooling. The cooling fins may form a corrugated surface of the temperature control region. In an exemplary embodiment, above described lid may have the cooling fins.

According to a further exemplary embodiment, the installation box may have a coolant duct (or coolant channel), wherein the cooling duct may run in the installation volume and may further run along or in the temperature control region, such that a thermal coupling between a coolant in the coolant duct and the temperature control region may be providable. In the cooling duct, the coolant, such as for example a liquid, for example water, may run. Herein, the coolant duct may run, for example, along an inner side of the installation box such that heat out of (or from) the installation volume may be received by the coolant. The coolant duct may further run along the temperature control region in order to emit the heat of the coolant to the temperature control area and accordingly further to the surroundings. Herein, the coolant duct may be in direct contact with a surface, in particular the inner surface, of the temperature control region in order to provide a thermal coupling. Furthermore, a heat conducting paste may be inserted between the coolant duct and the temperature control region. In an exemplary embodiment, a portion of the coolant duct may run through the detachable lid. The region of the coolant duct within the lid may be coupled fluid-tightly with regions of the coolant duct within the installation box by fluid couplings. The coolant duct may run along the temperature control region in a meandering pattern, in order to thereby increase the cooling distance along the temperature control region.

In order to provide a compact and at the same time robust implementation of the platform, it may be proposed according to the present invention, to form the base body of an elastically deformable material having a density of less than 2500 kg/m$^3$ and/or to couple a carrier structure with at least one elastically deformable carrier element to the base body, such that, after a load-induced deformation of the base body, the carrier element may re-deform the base body back in a load-free starting shape.

The terms "elastically deformable" may describe the property of the material of the base body and/or the carrier element, according to which the base body and the carrier element may deform back in their starting state after a deformation due to a particular application of a force. The starting state which the base body and/or the carrier element may be present without a deformation force (for example any external load force).

Herein, the base body may be formed such that it is spaced at a distance from the ground in a state, in which it may bear on the ground with the roller element and in which the test object may be attached on the attachment area. This means that only the at least one roller element may bear on the ground. During a test, the collision body may travel over the base body, such that the latter may deform and may bear on the ground, for example punctiform or over the entire surface, with its bottom surface. After the collision body may have travelled over the base body, the latter may deform back again into the original starting position.

Thus, the base body and hence the entire platform may be formed very flatly and robustly, because the base body may give in due to its elastic properties without breaking, as would be the case in the case of stiff and rigid bodies. Due to the flat formation of the base body, furthermore, the perception of assistance systems to be tested may be suppressed.

The elastically deformable material of the base body may have a density of about less than 2500 kg/m$^3$ (kilograms per cubic metre), in particular less than 2000 kg/m$^3$, less than 1800 kg/m$^3$ less than 1200 kg/m$^3$ and/or less than 800 kg/m$^3$. In an exemplary embodiment, the elastically deformable material of the base body may have a density between about 500 kg/m$^3$ and about 2500 kg/m$^3$, in particular between about 1000 kg/m$^3$ and about 2000 kg/m$^3$, or about 1800 kg/m$^3$.

According to a further exemplary embodiment, the material may have an E-module of less than about 60 GPa (at 20° Celsius). In particular, the material of the base body may have an E-module of less than 40 GPa, in particular less than about 20 GPa, less than about 15 GPa, less than about 10 GPa, or less than about 5 GPa (at 20° Celsius). The lower the E-module, the less stiff and more ductile may be the base body.

According to a further exemplary embodiment, the base body may have a thickness between the bottom surface and the attachment surface of less than 6 cm, in particular less than about 5 cm, or less than about 4 cm. Herein, the thickness may be the shortest distance between the bottom surface and the attachment surface. Beside the region having the lowest thickness, the base body may have in addition scattered thicker regions, such as, for example, the installation boxes described below. Due to the selection of the density according to the invention of the material of the base body, an extremely thin formation, in particular less than 6 cm thickness, may be possible.

According to a further exemplary embodiment, the base body may have a pressure resistance of at least 0.5 MPa, in particular at least 1 MPa. Thus, the base body may have a sufficient stability, so that a vehicle and/or a heavy goods vehicle as a collision body may drive over the base body without damaging it plastically and/or irreversibly. At the same time, a sufficient elastic deformability may be provided.

According to a further exemplary embodiment, the base body may be manufactured from a solid material or of a sandwich structure. The solid material may have pores, such as for example in a (hard) foam material, or cavities, such as for example in a rib structure. In the case of a sandwich material, force receiving stiff and/or hard top layers may be employed, which may be kept at a distance by a light core material. The core may also have a honeycombed inner structure. Thus, for example, interspaces may be present in the interior. In a solid material or the sandwich structure of the base body, for example, the installation boxes explained below are formed.

According to a further exemplary embodiment, the platform may have three roller elements, which may be arranged spaced at a distance at the bottom surface, wherein the roller elements may be formed such that the base body, may be displaceable along a ground by the roller elements.

According to a further exemplary embodiment, the base body may form a triangular, a quadrangular, a round or an oval ground view (or footprint). A triangular ground view may have three corner regions. For example, one roller element may be formed in each one of the corner regions. Correspondingly, a quadrangular ground view may have four corner regions, wherein one roller element may be formed in each of the corner regions.

According to a further exemplary embodiment, the platform may further have a steering mechanism, which may be configured to steer the at least one roller element. The roller element may be formed at the base body, for example rotatably. According to a further exemplary embodiment, the steering mechanism may have a steering motor (e.g. a servomotor, a linear motor), which may be coupled to the at least one roller element, in order to steer the roller element. For example, the steering mechanism may have a steering axis, to which the roller element may be attached rotatably. A servomotor of the steering mechanism, which may be arranged at the roller element or centrally in the base body, may steer the roller element around the steering axis after receipt of corresponding control commands.

According to a further exemplary embodiment, the roller element may be arranged in the installation box such that at least a part of the circumference of the roller element may protrude out of the installation box through the installation opening.

According to a further exemplary embodiment, the roller element may be beared rotatably in the installation box by an axle element. The axle element may be fixed in the installation box such that the axle element may be deformable (in particular elastically deformable) and/or displaceable in the direction towards the installation opening.

If the axle element is formed elastically deformable, upon a load of the base body, the roller element may, be pushed into the installation volume without, for example, a region of the roller element protruding outwardly from the installation volume. Thus, the base body may deform and may, for example, be pressed against the ground without the roller element being damaged. Due to the elastic deformation of the axle element, the latter may deform back in its starting position after the load of the base plate has been stopped. In this starting position, the roller element may protrude again partially out of the installation volume and from the bottom surface, so that the platform may be rolled over the ground again.

According to a further exemplary embodiment, the axle element may be preloaded in the direction towards the installation opening by a preload spring, wherein the installation opening of the installation box may be formed in the bottom surface of the base body. The axle element may, for example, be formed stiffly and robustly, and may be preloaded with a preload spring such that the roller element, in an unloaded state of the base body, may protrude at least partially out of the installation opening, so that the platform can roll along the ground. Upon a load of the platform in the direction towards the ground, the axle element and thus also the roller element may be pushed in the direction towards the interior of the installation box, until the roller element may be present, completely in the installation volume and thus may be protected. After a load removal of (or from) the platform, the preload spring may pull or push the roller element again in the direction towards the starting position. For a better guidance, the axle element may be arranged in guiding rails, which may be arranged at the ends of the axle element, and wherein the guiding rails may be fixed to the installation box.

According to a further exemplary embodiment, the platform may have a carrier structure having at least one elastically deformable carrier element, which may be coupled to the base body such that, after a load-induced deformation of the base body, the carrier element may form the base body back in a load-free starting shape.

The carrier structure with the at least ogre elastically deformable carrier element may be coupled to the base body. After a load-induced deformation of the base body, that is after the base body is present without external load, the carrier element and thus the base body may form back in a load-free as much as possible plane, unarched starting shape.

The carrier structure ay form a self-supporting structure, which may reinforce the base body such that the base body may remain undeformed to a large extent due to the load with the test object and the effect of the gravitational force. In other words, the base body may be deformed, wherein the necessary stability may be formed by the carrier structure. The carrier structure may be formed, for example, in the interior of the base body, for example in a mounting process or by integrating the carrier structure during a mold process of the base body. Alternatively, the base body may be arranged at a surface of the base body. The base body may further have according indentations such as for example notches, in which the carrier structure may be integrated.

The carrier structure may be formed in particular from a material, which may have a density of more than 2500 kg/m$^3$ and, for example, an E-module of more than 60 GPa. The material of the carrier structure may be, for example, a metallic raw material such as, for example, aluminium or an elastic plastic material.

The carrier structure may consist, for example, of carrier elements, which may be connected to each other at their respective ends. The carrier elements may consist for example of bracers or rods in order to form the supporting carrier structure.

According to a further exemplary embodiment, the carrier structure may be formed such that the carrier element may be preloaded in the base body so the base body may be present elastically deformed in the load-free starting position. Thus, the base body may be, for example, held under tension, so that despite the thin and light construction of the base body, a stiffness may be increased.

According to a further exemplary embodiment the base body may have at one coupling element, which may displaceably couple the carrier element to the base body. The coupling element may be formed in particular as a bushing, and the carrier element may be formed as a carrier bar, which may be beared slidably in the bushing. Accordingly, the carrier bar may have an end region having a hollow profile, and the base body may have a corresponding protruding element and/or a pin, which may engage in the hollow end region of the carrier bar. The coupling element may be formed, for example, also as a lug, a flap (or butt strap) or a blind hole into the base body.

The carrier bar may have in particular an extension direction. The carrier bar may be coupled in the coupling element translationally slidably along the extension direction. The carrier bar and the base body may have different heat extension coefficients due to their different materials. For example, the carrier structure (for example, made of metal) may deform less than the base body (for example, made of plastic material) due to temperature influences. Due to the lesser deformation of the carrier structure, a deformation of the base body, which may be induced thereby, may be prevented, because the carrier structure, and/or in particular its carrier bars, may move along their extension direction without the base body being accordingly extended and/or deformed or arched directly proportionally. Upon an elongation of the carrier bar, a tolerance (or clearance) in the coupling element may be utilized initially (due to the translational movement possibility between the coupling element and the carrier bar), until a direct force transmission to the base body may take place due to the elongation. Thus, a high form stability of the platform by be achieved also for quickly changing temperatures.

According to a further exemplary embodiment, the carrier structure may be configured such that the elastically deformable carrier element may be coupled to the base body, such that the carrier element may act against a thermally induced deformation of the base body. For example, the carrier element may be formed stiffer than the base plate, such that a thermal deformation, in particular a warping, of the base plate may be prevented due to the bending stiffness of the carrier elements. The carrier elements may consist, for example, of the carrier bars described above and thus generally may have a heat elongation in their extension direction. The carrier bars may be robust against a warping force of the base plate and thus may act against a deformation of the base plate. In an alternative embodiment, for example the heat extension coefficient of the material of the carrier element may be greater than the heat extension coefficient of the material of the base body.

According to a further exemplary embodiment, at least one installation box may be arranged in a receiving opening of the base body. The coupling element may be arranged at the installation box. For example, the coupling element may be formed integrally with the installation box. In particular, the coupling element may consist of the same material as the installation box. In a preferred embodiment, both the coupling element and the installation box may consist a metallic raw material and thus may have a higher stiffness and hardness comparison to the more ductile plastic material.

In a further exemplary embodiment, the base body may have at least three outer edge regions, wherein the carrier structure may have at least three carrier elements, for example carrier bars. A respective one of the carrier elements may run along the outer edge regions. Respective two of the carrier elements may be connected mutually to each other at their end sections, for example each by a common coupling element and/or by a common installation box. The carrier elements thus may run respectively parallel to the edges of the corresponding outer edge regions of the base body. Thus, a robust and supporting bearing structure for a defined reinforcement (or stiffening) of the base body may be achieved.

According to a further exemplary embodiment, two opposing carrier elements respectively may have further coupling elements. The carrier structure in addition may have at least one connection carrier, which may, with its ends, fixed displaceably (along its extension direction) respectively in one of the coupling elements. The connection carrier thus may form a cross-brace, by which the carrier structure may become more warp resistant.

It is pointed out that the embodiments described herein represent only a limited selection of possible embodiment variants of the invention. Thus, it is possible to combine the features of individual embodiments in a suitable manner such that a plurality of different embodiments is to be considered as obviously disclosed for the skilled persons with the herein explicit embodiment variants. In particular, some embodiments of the invention are described by device claims and other embodiments of the invention by method claims. However, upon reading this application, the skilled person will immediately understand that, unless it is not explicitly stated differently, in addition to a combination of features which, belong to one type of invention object, also an arbitrary combination of feat which belong to different types of invention objects, is possible.

SHORT DESCRIPTION OF THE DRAWINGS

Figure 2:
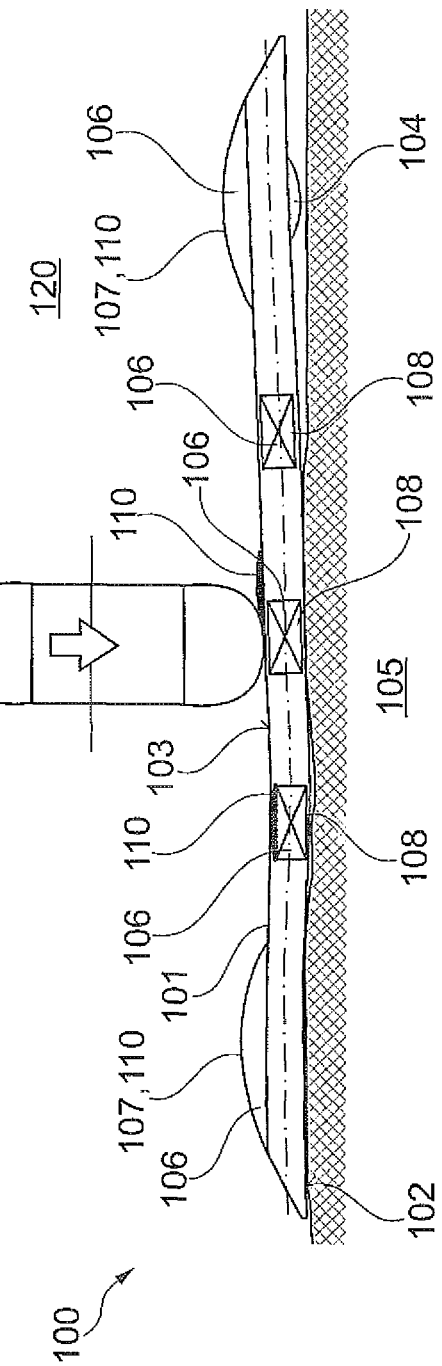
Figure 3:
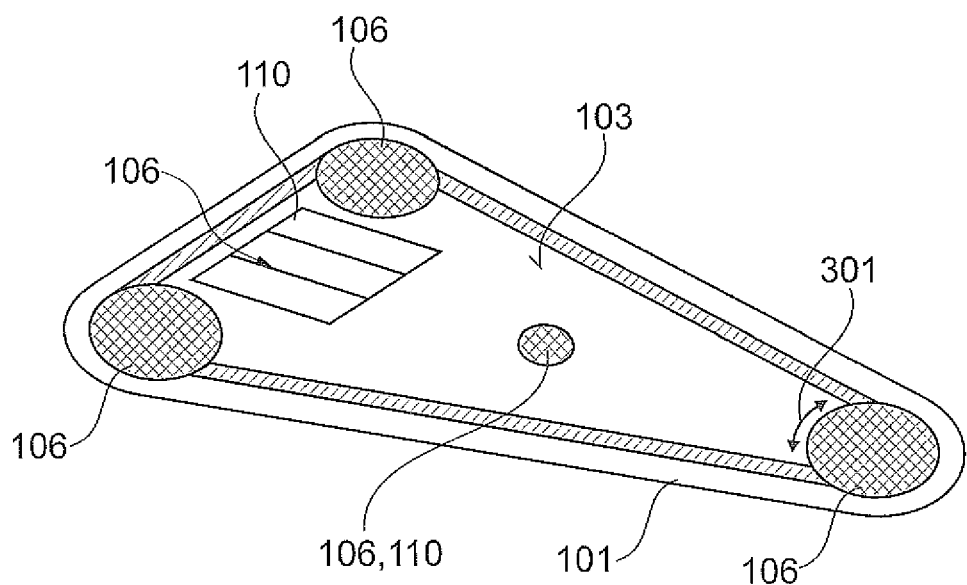
Figure 4:
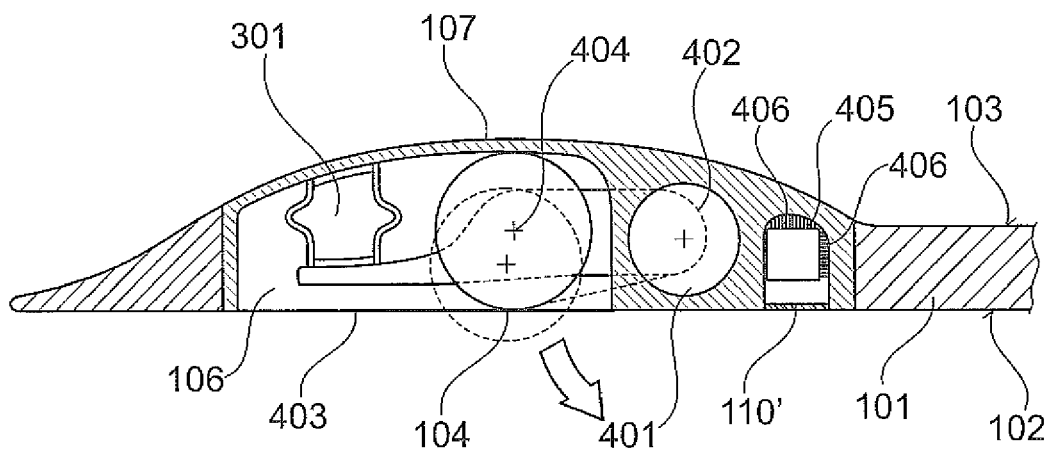
Figure 5:
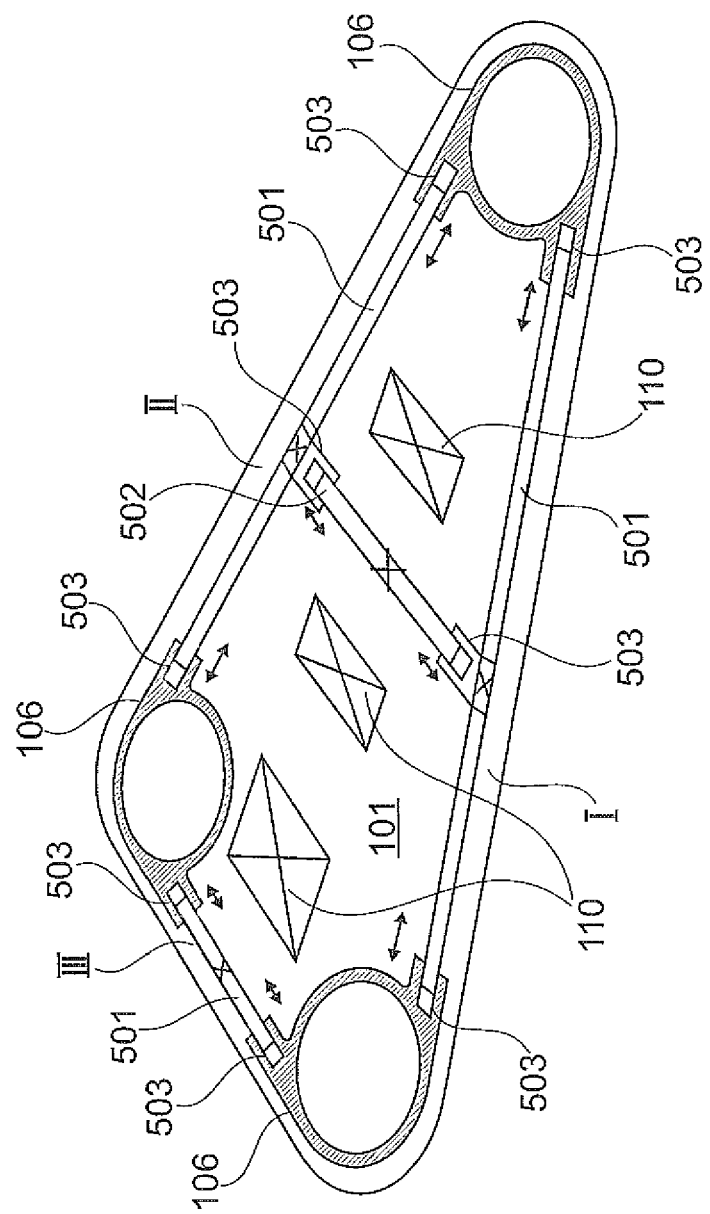

In the following, embodiment examples are described in more detail with reference to the appended drawings for a further explanation and for a better understanding of the present invention. In the drawings:

FIG. 1 shows a schematic illustration of a platform according to an embodiment example of the present invention, wherein the platform lies on the ground in an unloaded state, FIG. 2 shows a schematic illustration of the platform of FIG. 1, wherein the platform is represented in loaded state, FIG. 3 shows a perspective illustration of a platform according to an embodiment example of the present invention, FIG. 4 shows a cross-sectional illustration of an installation box of a platform according to an exemplary embodiment of the present invention, and FIG. 5 shows a schematic illustration of a platform in which a carrier structure is arranged, according to an exemplary embodiment of the present invention.

DETAILED DESCRIPTION OF EXEMPLARY EMBODIMENT

Equal or similar components in different figures are provided with same reference numerals. The illustrations in the figures are schematic.

FIG. 1 and FIG. 2 show a platform 100 for testing collisions or near-collision situations between a collision body, in particular a vehicle, and a test object. The platform 100 may have a base body 101, which may have a bottom surface 102 and an attachment surface 103 that may be formed opposite to the bottom surface 102, wherein an attachment device 109 may be formed on the attachment surface 103 for fixing the test object. Furthermore, the platform 100 may have at least one roller element 104, which may be arranged at the bottom surface 102, wherein the roller element 104 may be formed such that the base body 101 may be movable along a ground 105 by the roller element.

The platform 100 may have an installation box 106 having an installation volume, which may be arranged in a receiving opening of the base body 101. The installation box 106 may have an installation opening 403 (see FIG. 4), through which the installation volume may be, accessible from the outside. The installation box 106 may be provided in the receiving opening of the base body 106 such that a temperature control region 110 of the installation box 106 may be in contact with surroundings 120 of the base body 102. The temperature control region 110 may be formed of a material, which may have a greater heat conductivity coefficient than a material of the base body 101.

The collision body may be, for example, a passenger car, which may drive against a test object fixed on the platform 100, in order to effectuate an impact with test object and/or to test driver assistance systems in the passenger car. Herein, the collision body and/or the vehicle may drive with its vehicle tires 200 over the platform 100 such that the latter may deform elastically (see FIG. 2).

The test object may be, for example, a human-like dummy, which may be attachable standing, lying or sitting on the platform.

The platform 100 may be displaceable along a ground 105 by roller elements 104. The platform 100, on which the test object may be arranged, may cross the driving path of the collision body such that the approach of the test object to the collision body may be measured by driver assistance systems and the latter may be tested hereby.

The platform 100 may have the base body 101, which may form a sheet-like (or board-like) shape. This means, that an extension in a ground plane may be significantly greater than its thickness in, for example, a vertical direction. Herein, the base body 101 may have a lower bottom surface 102 and an opposing upper attachment surface 103. The base body 101 may be beared with its bottom surface on the ground 105. In the bottom surface 102, roller elements 104 may be arranged rotatably, which may protrude at least partially from the base body 101 and thus may provide a space (or distance) between the base body 101 and the ground 105. An attachment device 109 may be formed on the attachment surface 103. The attachment device may be configured to fix the test object.

The attachment device 109 may, for example, consist of a hook system, in which the test object may be hooked up. Furthermore, the attachment device 109 may have a magnet, in particular a controllable electromagnet, in order to fix the test object to the attachment surface by a magnetic holding force.

The roller elements may be arranged at the bottom surface 102. The platform 100 may be displaceable along the ground 105 by the roller elements 104. Herein, the platform 100 may be formed freely displaceable, in that the roller element may be driven itself as is described in more detail below and, according to an exemplary embodiment, may be configured steerable.

In order to provide a compact and at the same time however robust implementation of the platform 100, the base body 101 may be formed of an elastically deformable material having a density of less than 2500 kg/m³ and/or a carrier structure (see FIG. 5) having at least one elastically deformable carrier element 501 (see FIG. 5) for coupling with the base body 101, such that, after a load-induced deformation of the base body 101, the carrier element 501 may form the base body 101 back in a load-free starting shape.

The base body 101 may be configured such that it is spaced at a distance from the ground 105 (see FIG. 1) in a state, in which the base body may bear on the ground 105 with the roller elements 104 and in which the test object may be attached on the attachment surface 103. This means that only the roller elements 104 may bear on the ground 105.

During a test, the collision body may drive over the base body 101 for example with a tire 200, such that the base body, may deform and may bear on the ground 105 with its bottom surface 102, for example punctually or across the entire surface. After the tire 200 may have driven over the base body 101, the latter may deform back again in the original starting position.

Thus, the base body 101 may be formed very flatly and robustly, because the base body 101 may give in due to its elastic properties without breaking, as it would be the case in the case of stiff and rigid bodies.

The base body 101 may have a thickness between the bottom surface 102 and the attachment surface 103 of less than about 6 cm. Herein, the thickness may be the shortest distance between the bottom surface 102 and the attachment surface 103. Besides the region with the lowest thickness, the base body 101 may further have scattered thicker regions, such as, for example, the installation boxes 106 described below. Due to the selection according to the invention of the density of the material of the base body 101, an extremely thin configuration, in particular less than 6 cm thickness, may be possible.

As it is represented in FIG. 1 and FIG. 2, the base body 101 may be manufactured from a solid material. For example the installation boxes 106 may be formed in the solid material of the base body 101.

The installation box 106 may be formed integrally, for example, as a recess in the base body 101, One or more functional elements of the platform 100 may be incorporated in the installation volume of the installation box 106. In this way, for example, the roller elements 104, sensors, drive units or control units may be tailed in the installation box.

The temperature control region 110 of the installation box 106 may be a region of the latter, which may be in contact with surroundings 120 of the base body 101, i.e. for example with the ambient air of the base body 101. Thus, the ambient air of the base body 101 may be employed as a coolant, and the temperature control region 110 may emit heat from (or out of) the interior of the installation box 106 to the surroundings. Thus, in particular the temperature of functional units in the installation volume may be dissipated to the outside via the temperature control region 110 to the surroundings.

In particular the temperature control region 110 may be formed of a material, which may have a greater heat conductivity coefficient than a material of the base body 101.

A lid may form the temperature control region 110 at least partially, wherein the lid may be detachable such that an access to the installation volume may be providable. The lid may close the installation opening 403 of the installation box 106 and thereby may protect the functional devices within the installation box 106.

The installation box 106 may project from the attachment surface 103 with a region, as is illustrated in FIG. 2 and FIG. 2, wherein the region may form in particular a dome shape 107. Thus, the dome shape 107 may form a bent (or curved) cap (or bonnet), which may protrude from a plane, in which the attachment surface 103 may run. Thereby, a sufficient installation space may be established also for a thin implementation of the base body 101. Due to the dome shape 107, sensor radiations, such as for example radar radiation, which may be generated by the assistance systems to be tested, may be reflected back at an angle, by which the reflected radiations may not be measurable. Thus, it may be prevented that the assistance systems may measure interferences (or disturbances) which may result due to the thickening of the installation volume.

The dome shape 107 may be formed, for example, by the lid described above. In other words, the lid and thus also the temperature control region 110 may have a dome shape 10, wherein the lid may be detachably attached to the base body 101 and/or the installation box 106.

The installation boxes 106, which may be spaced at, a distance, may be coupled to each other e.g. functionally, for example for a data exchange (for example via conducting wires or fibre optic cables).

The roller elements 104 may be arranged in the installation boxes 106 such that at least a part of the circumference of the roller elements 104 may protrude out of the installation box 106 through the installation opening.

Furthermore, a sensor element 108, in particular an acceleration sensor, an optical sensor or a temperature sensor, which sensor element may be arranged in the installation box, may be provided in the platform 100.

FIG. 3 shows a perspective illustration an exemplary embodiment, wherein the platform 100 may have three roller elements 104, which may be arranged spaced at a distance at the bottom surface 102. The base body 101 may form triangular plan view. A triangular plan view may have three corner regions. In each one of the corner regions, for example one roller element 104 may be formed. In this way, a high rolling stability and a good controllability (or steerability) of the platform may be given.

The platform 100 may further have a steering mechanism 301, which may be configured to steer at least one roller element 104 (see the double arrow in FIG. 3). The roller element 104 may be formed rotatably at the base body 101. The steering mechanism 301 may have a steering motor (e.g. servomotor), which may be coupled to the at least one roller element 104, in order to steer the roller element 104. For example, the steering mechanism may have a steering axle, to which the roller element 104 may be fixed rotatably. The servomotor of the steering mechanism 301 which may be arranged at the roller element 104 or centrally in the base body 101, may steer the roller element 104 around the steering axle after receipt of according control commands.

FIG. 4 shows a cross-section illustration of the platform 100 and an installation box 105 according to exemplary embodiment of the present invention. A drive unit 401 (e.g. an electromotor), which may be configured to drive the at least one roller element 104, may be arranged in the installation box 106. The drive unit 401 may drive one or more roller elements 104 simultaneously.

Furthermore, a steering mechanism 301 is represented, which may be configured to steer the at least one roller element 104. The roller element 104 may be formed, for example, rotatably at the base body. The steering mechanism 301 may have a steering motor (e.g. a servomotor), which may be coupled to the at least one roller element 104, in order to steer the roller element 104. For example, the steering mechanism 301 may have a steering axle, to which the roller element 104 may be attached rotatably. The servomotor of the steering mechanism 301, which may be arranged at the roller element 104 or centrally in the base body 101, may steer the roller element 104 around the steering axle after receipt of according control commands.

Furthermore, in the embodiment example of FIG. 4, the installation box 106 may form a self-supporting unit, in that it may be arranged in the base body 101 and/or in a receiving opening provided accordingly for this. The installation box 106 may be formed of a material, which may be stiffer than the material of the base body 101, wherein the material of the installation box may have in particular a density of more than 2500 kg/m³. Thus, for example the functional elements may be installed protectedly in the installation box 106, while the base body 101 may deform elastically around the installation box 106. In this way, it may be ensured that, upon a load of the platform 100, the base body may deform elastically, however without impairing the sensible functional elements, because these may be present in the stiffer and harder installation box.

The installation opening 403 of the installation box 106 may be formed in bottom surface 102 of the base body. Thus, a simple access to the installation box may be provided via the bottom surface 102.

An adapter means, in particular a heat conducting paste 406, may be provided between the functional element, such as for example the control unit 405 illustrated in FIG. 4, and the temperature control region 110 such that a heat transfer from the functional element to the temperature control region 110 may be providable.

In FIG. 4, a functional unit be a drive unit 401, which may be configured to drive the at least one roller element 104. In the embodiment example of FIG. 4, the drive unit 401 may be arranged spaced at a distance to the at least one roller element 104, wherein the drive unit 401 may be coupled to the roller element 104 for transmission of a driving force, in particular by a drive belt 402. In FIG. 4, the drive unit 401 may be in (thermal) contact to the full extent with the material and/or with the temperature control region 110 of the installation box 106.

Furthermore, the steering unit 405 for steering the roller elements 104 may be installed in the installation box 106, wherein the steering unit 405 may be configured for a wireless data exchange with a further external operating unit (not shown), which may be configured to generate control data. The control unit 405 may have, for example, a transmission and receiving unit, by which measurement data, control data or other information may be transmitted to a unit (not shown), which may be external and spaced at a distance. Furthermore, the steering unit 405 may be coupled to the roller elements 104 and the drive units 401 in order to thus control the drive of the roller elements 104 and the steering mechanism 301 of the roller elements 104.

The roller element 104 may be beared rotatably in the installation box 106 by an axle element 404. The axle element 404 may be fixed in the installation box 106 such that the axle element 404 may be deformable (in particular elastically deformable) and/or displaceable in the direction towards the installation opening 403.

If the axle element 404 may be formed elastically deformable, the roller element 104 may be pushed into the installation volume upon a load of the base body 101, without, for example, a section of the roller element 104 protruding outwardly from (or out of) the installation volume. Thus, the base body 101 may deform and may, for example, be pushed against the ground, without the roller element 104 being damaged. Due to the elastic deformation of the axle element 404, this may deform back in its starting position after the load of the base plate 101 may have been stopped. In this starting position (illustrated dottedly in FIG. 4), the roller element 104 may protrude again partially out of the installation volume and from the bottom surface 102, such that the platform 100 may be rolled over the ground again.

The axle element 404 may also be preloaded (or strained) by a preload spring in the direction towards the installation opening 403. Upon a load of the platform 100 in the direction towards the ground, the axle element 404 and thus also the roller element 104 may be pushed in the direction towards the interior of the installation box 106, until the roller element 104 may be completely present in the installation volume and may thus be protected. After relief of the platform 100, the preload spring may pull or may push the roller element 104 again in the direction towards the starting position. For a better guidance, the axle element 404 may be be arranged in guiding rails, which may be arranged at the ends of the axle element 404, and which may be attached to the installation box 106.

FIG. 5 shows the platform 100, in which a carrier structure (or support structure) is arranged, according to an exemplary embodiment of the present invention. In order to provide a compact and at the same time however also robust embodiment of the platform 100, the base body 101 may be coupled to a carrier structure consisting of at least one elastically deformable carrier element 501, such that, after a load-induced deformation of the base body 101, the carrier element 501 may deform the base body 101 back in a load-free starting shape. The carrier structure may be coupled to the base body 101 with elastically deformable carrier elements 501. After a load-induced deformation of the base body 101, that is after the base body 101 may be present without external load, the carrier element 501 may form itself and thus the base body 101 back into a load-free starting shape.

The carrier structure may form a self-supporting structure, which may reinforce the base body 101 such that the base body 101 may remain undeformed due to the load by the test object and the effect of the gravitational force. In other words, the base body 101 may be deformed, wherein the necessary stability may be formed by the carrier structure. The carrier structure may be formed in the interior of the base body 101, for example by integrating the carrier structure during a mold process of the base body 101.

The carrier elements 501 may be displaceably coupled to the base body 101. A bushing as the coupling element 503 ay receive a carrier bar as a carrier element 501, wherein the carrier element 501 may be beared displaceably in the bushing. The carrier bar mays have in particular an extension direction. The carrier bar may be coupled translationally displaceable along the extension direction in the coupling element 503. Despite a larger or smaller deformation of the carrier structure, thus a deformation of the base body induced to this may be prevented, without the base body 101 being accordingly directly proportionally extended and/or being deformed. Upon an elongation of the carrier bar, initially, a tolerance (or clearance) in the coupling element 503 (due to the translational movement possibility between the coupling element 503 and the carrier bar) may be utilized, until a direct force transmission to the base body 101 may take place due to the elongation.

The coupling element 503 may be arranged at the installation box 106. For example, the coupling element 503 may be formed integrally with the installation box 106. In particular, the coupling element 503 may consist of the same material as the installation box.

The base body 101 of FIG. 5 may have, for example, a triangular shape having at least three outer edge regions, wherein the carrier structure may have at least three carrier elements 501, for example, carrier bars. A respective one of the carrier elements 501 may run along the outer edge regions. Respective two of the carrier elements 501 may be coupled at their end sections to a common installation box 106, for example respectively via one coupling element 503. Thus, the carrier elements 501 may run, respectively, parallel to the edges of the corresponding outer edge regions of the base body 101. Thus, a robust and supporting bearing structure for a defined reinforcement (or stiffening) of the base body 101 may be achieved.

Two opposing carrier elements 501, respectively, may have further coupling elements 503. The carrier structure may have at least one connection support 502, which may be fixed displaceably (along its extension direction) with its ends, respectively, in one of the coupling elements 503. The connection carrier 502 thus may form a cross-brace (or stabilizer bar), by which the carrier structure may become more warp resistant.

Supplementarily, it is to be pointed out that "having" (or "comprising") does not exclude other elements or steps, and "a" or "an" does not exclude a plurality. Furthermore, it is pointed out that features or steps, which have been described with reference to one of the embodiment examples . . .

Supplementarily, it is to be noted that "having" (or "comprising") does not exclude other elements or steps, and "a" or "an" do not exclude a plurality. Furthermore, it is to be noted that features or steps, which have been described with reference to one of the embodiment examples described above can also be used in combination with other features or steps of other embodiment examples described above. Reference numerals in the claims are not to be considered as limitations.

LIST OF REFERENCE NUMERALS 100 platform
101 base body
102 bottom surface
103 attachment surface
104 roller element
105 ground
106 installation box
107 dome shape
108 sensor element
109 attachment device
110 temperature control region
120 surroundings
200 tire
301 steering mechanism
401 drive unit
402 drive belt
403 installation opening
404 axle element
405 control unit
406 heat conducting paste
501 carrier element
502 connection support
503 coupling element

The invention claimed is:

1. A platform for testing collisions or near-collision situations between a collision body and a test object, the platform comprising:
  a base body having a bottom surface and an attachment surface formed opposite to the bottom surface, wherein an attachment device is located at the attachment surface for attaching a test object;

at least one roller element located at the bottom surface, wherein the roller element is configured to displace the base body along a surface of the ground;

an installation box having an installation volume, wherein the installation box is located in a receiving opening of the base body, and wherein the installation box is configured to enclose and protect at least one functional element during a collision; and an outward protrusion extending outwardly from the attachment surface, wherein the outward protrusion includes a substantially domed shape, wherein a receiving cavity is defined in the outward protrusion under the domed shape, and wherein at least a portion of the installation box is located within the receiving cavity.

2. The platform according to of claim 1, wherein the installation box includes a temperature control region formed of a material which has a greater heat conductivity coefficient than a material of the base body.

3. The platform of claim 2, further comprising a lid configured to provides access to the installation volume, wherein the lid further comprises a sealing element, and wherein the lid at least partially defines the temperature control region.

4. The platform of claim 2, further having wherein the functional element is thermally coupled to the temperature control region such that heat transfer occurs from the functional element to the temperature control region, and
wherein the functional element is a drive unit configured to drive the at least one roller element.

5. The platform of claim 4, further comprising a sensor located in the installation volume, wherein the sensor is selected from the group of consisting of acceleration sensor, an optical sensor, a position measurement sensor, and a temperature sensor.

6. The platform of claim 4, further comprising
a control unit for controlling the drive unit, wherein the control unit is located in the installation volume, wherein the control unit is thermally coupled to the temperature control region, and wherein the control unit is configured for wireless data exchange with a an external operating unit.

7. The platform of claim 4, wherein the temperature control region further includes a plurality of outwardly protruding cooling fins, and wherein the cooling fins are placed in contact with ambient air.

8. The platform of claim 2, wherein the installation box further comprises a coolant duct, wherein a volume of coolant is configured to flow through the coolant duct, and wherein the coolant is further placed in thermal communication the temperature control region.

9. The platform according to of claim 1, wherein the installation box is formed of a material which is stiffer than a material of the base body, and wherein the material of the installation box has a density of greater than 2500 kg/m3.

10. The platform of claim 1, wherein the receiving opening is located in the bottom surface of the base body.

11. The platform of claim 1,
wherein the base body is formed of an elastically deformable material having a density less than 2500 kg/m$^3$, and
wherein the elastically deformable material has an E-module of less than 60 GPa.

12. The platform of claim 11, wherein the elastically deformable material is selected from the group consisting of an organic material, a fiber composite material, and a polymeric material, and wherein the temperature control region is formed of aluminum.

13. The platform of claim 12, wherein the base body is manufactured from a solid material.

14. The platform of claim 1, further
comprising a steering mechanism, wherein the steering mechanism includes a steering motor operably coupled to the roller element, wherein the steering mechanism is configured to steer the at least one roller element.

15. The platform of claim 1, further comprising three roller elements, wherein the three roller elements are arranged spaced at at the bottom surface.

16. The platform of claim 1,
wherein the roller element is arranged in the installation box such that at least a part of the circumference of the roller element protrudes out of the installation box through the receiving opening;
wherein the roller element is rotatably maintained in the installation box by an axle element, wherein the axle element is fixed in the installation box such that the axle element is elastically deformable; and
wherein the axle element is preloaded in the direction towards the installation opening by a preload spring.

17. The platform of claim 1, further
comprising a carrier structure having at least one elastically deformable carrier element, wherein the carrier element is coupled to the base body such that after a load-induced deformation of the base body the carrier element forms the base body back in the load-free starting shape.

18. The platform of claim 1, wherein the base body is configured to be rolled over by a collision body, wherein a portion of the base body is elastically deformable, wherein the portion of the base body is configured to deform in response to a load imparted by the collision body, and wherein the base body is configured to return to a load-free starting shape after removal of the load.

19. A platform for testing collisions and near-collision situations between a collision body and a test object, the platform comprising:
a base body having a bottom surface and an attachment surface located opposite to the bottom surface, wherein a thickness of the base body between the bottom surface and the attachment surface is less than 6 cm;
an attachment device located at the attachment surface, wherein the attachment device is configured to retain a test object;
at least one roller element located at the bottom surface of the base body, wherein the roller element is configured to move the base body along a surface of the ground;
an installation box located in a receiving opening of the base body, wherein a temperature control region of the installation box is in contact with exterior surroundings of the base body, and wherein the temperature control region is formed of a material which has a greater heat conductivity coefficient than a material of the base body; and
an outward protrusion extending upwardly from the attachment surface, wherein a hollow receiving cavity is defined by the outward protrusion, and wherein at least a portion of the installation box is located within the hollow receiving cavity.

20. The platform of claim 19, wherein the outward protrusion defines a dome shape.

* * * * *